United States Patent

Tak

[11] Patent Number: 5,635,956
[45] Date of Patent: Jun. 3, 1997

[54] COMPACT MOUSE STRUCTURE

[76] Inventor: Seung H. Tak, Plaza Apt. 2-810, Kil-dong, Kangdong-ku, Seoul, Rep. of Korea

[21] Appl. No.: 513,866
[22] PCT Filed: Mar. 19, 1994
[86] PCT No.: PCT/KR94/00024
   § 371 Date: Sep. 14, 1995
   § 102(e) Date: Sep. 14, 1995
[87] PCT Pub. No.: WO94/22071
   PCT Pub. Date: Sep. 29, 1994

[30] Foreign Application Priority Data

Mar. 19, 1993 [KR] Rep. of Korea ............. 1993-4285

[51] Int. Cl.$^6$ ............................................. G09G 5/08
[52] U.S. Cl. ................................... 345/163; 345/157
[58] Field of Search ............................ 345/163, 165, 345/166, 179; 382/59, 313, 314; 235/432, 462

[56] References Cited

U.S. PATENT DOCUMENTS 5,288,993  2/1994  Bidiville et al. .................. 345/163

Primary Examiner—Richard Hjerpe
Assistant Examiner—David L. Lewis
Attorney, Agent, or Firm—Armstrong, Westerman, Hattori, McLeland & Naughton

[57] ABSTRACT

A compact mouse structure comprises a small ball of the golf ball type on the surface of which a plurality of concaved optical reflectors is formed or the image information is written, and for detecting the position displacement as well as for enabling the ball to contain the position displacement information and the control parameter information, thereby realizing its compact structure.

4 Claims, 5 Drawing Sheets

LIGHT EMITTING DIODE

PHOTO TRANSISTOR 1

PHOTO TRANSISTOR 2

AXIS MOVEMENT DISPLACEMENT

FIG. 5B
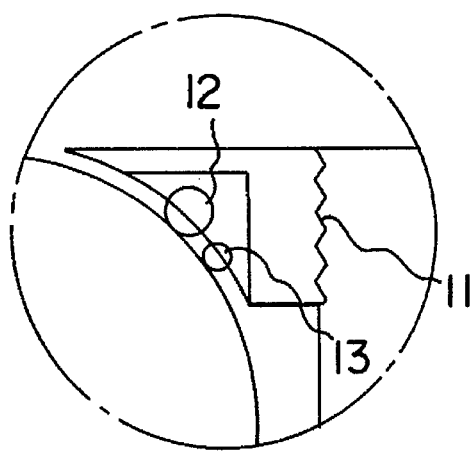
FIG. 5
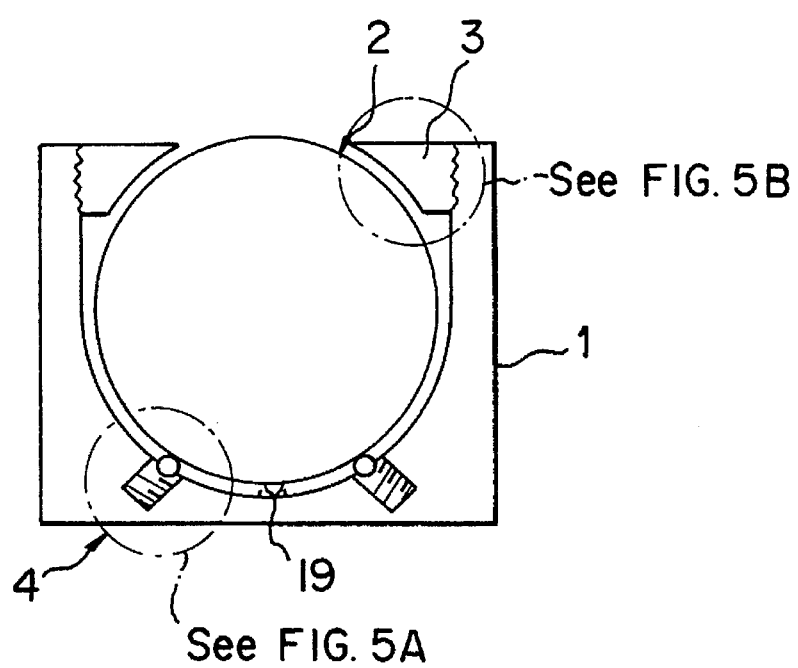
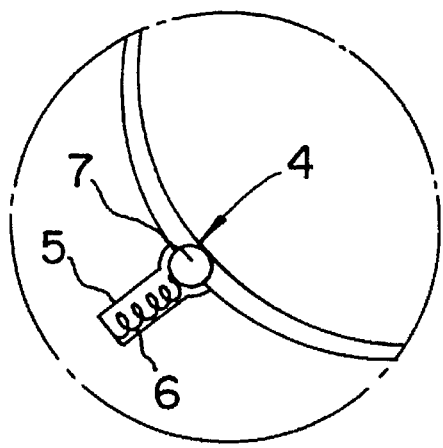
FIG. 5A

COMPACT MOUSE STRUCTURE

TECHNICAL FIELD

The invention is related to providing a mouse, and in particular, to providing a compact or miniature mouse structure to be constructed in a small configuration.

BACKGROUND ART

A general mouse is widely used at the out-station as an input apparatus for the relative coordinate, including an optical reflecting tool or plate, a light source, and a light receiving circuit installed therein.

A typical mouse includes a ball placed on its bottom, so that as the ball moves, the rotary optical encoders attached to the ball in the X and Y coordinate detects the relative position of the ball.

As shown in FIG. 1, two optical encoders 2 and 3 are mounted at the proper positions of both sides adjacent to a ball 1. The optical encoder is constituted as three parts. Concretely, each of two optical encoders 2 and 3 are provided with rollers 4 and 5 rotated in the X and Y axes in contact with the surface of the ball 1 according to the vertical or horizontal rotation of the ball 1 (it is noted in the drawing that the X and Y directions are different from the real ones of the balls if accurately positioned). The roller 4 has a shaft at its center, and the shaft is fixed at the center of a circular plate 6 having a plurality of holes around its periphery, so that the rotation of the roller 4 forces the circular plate 6 to be rotated.

The circular plate 6 includes paired photo-couplers 8 and 9 mounted on both side surfaces adjacent to holes perforated around its periphery. For example, the light emitting diode of the photo-coupler 8 is positioned on the front surface of the circular plate 6 and the photo-transistor on the rear surface.

In such a manner, the optical encoder 3 is also provided with a roller 5 having a shaft at its center, a circular plate 7 and paired photo-couplers 11 and 12.

Therefore, in the X and Y optical encoders 2 and 3 the circular plates 6 and 7 are rotated as the rollers 4 and 5 are rotated in contact with the ball 1. At this time, the photo-couplers 8, 9, 10 and 11 are operated in a manner that as the circular plates 6 and 7 are rotated, their light emitting diodes are turned on and their photo-transistors receive the light from the light emitting diode facing thereto, as shown in FIG. 2. Thus, the position displacements of the ball 1 are determined in the X and Y axes by the phase differences occurred as to whether the photo-transistors receive the light, or not during the lighting of the light emitting diodes.

Such mouse requires the high space occupation rate in mounting the optical encoders therein to restrain from its compact configuration. It has the limitations in accomplishing the high speed operation in the mechanical respect because of the sliding phenomena between, the ball and the rollers. It shortens the life due to the friction between the mechanisms and fears that the error during the operating often happens with being freely exposed to the dusts.

There is the other typical mouse of the optical pad detecting type as shown in FIG. 3 which includes a housing 20 and a mouse pad 21. The housing 20 is provided with an optical sensor 22 of the X axis for detecting its horizontal movement and an optical sensor 23 of the Y axis for detecting its vertical movement mounted on the bottom thereof. The optical sensors 22 and 23 each comprises a photo-coupler provided with a light emitting diode and a photo-transistor so that the light of the light emitting diode is received at the photo-transistor, reflecting on the optical pad 21.

The optical pad mouse also detects the phase displacement according to the signals received from each of the photo-transistors as shown in FIG. 2. It does not have two optical encoders of the X and Y axes in the ball mouse, but requires a separate optical pad to refrain from its compact. Also, the optical pad has an influence upon the life of the system and the mouse has a disadvantage that the error in operation may occur due to dust on the optical pad.

This mouse enables the relative position displacement to be easily appointed, but it is not possible to appoint the absolute position, accurately, as well as to have another function except for the function for detecting the position displacement.

In light of these points, it is very desirous if a mouse structure does not require an optical encoder and an optical pad to become the compact figuration, accomplishes the high speed and the high solution and detects not only the relative position but also the absolute position. In other words, the mouse structure enables the wide adaption, for example Palm tops, Sub-notebooks, Desktop and can be easily applied to the control of a game, an industrial mechanism and a workstation or a home appliance.

Accordingly, the object of the invention is to provide a compact mouse having an optical reflector of a golf-ball type capable of being miniaturized.

Another object of the invention is to provide a compact mouse structure having information of the position displacement and the operation control of an appliance in a matrix or image information form.

Still another object of the invention is to provide a compact mouse structure having a ball on the surface of which a position displacement and predetermined control information can be written.

DISCLOSURE OF THE INVENTION

The invention comprises a housing; a small mouse ball having a plurality of concaved reflectors on the surface of which the light reflecting material and the transparent material are doubly coated by a predetermined thickness; and a photo-coupler mounted in the housing in the vertical and horizontal arrangement with respect to the concaved reflectors to emit the lights and receive the reflected lights.

Thus, the invention has the image information pattern and matrix on the predetermined position of the ball, so that the ball can have the control information of the electronic appliances in addition to the position displacement information, whereby it can be used in a small scanner. Also, the invention can realize the configuration of a pen mouse type by miniaturizing the compact mouse structure more.

BRIEF DESCRIPTION OF THE DRAWINGS

The invention will be now explained in detail with reference to the drawings.

FIG. 5 is a crosssectinal view illustrating the compact mouse structure according to the invention;

FIG. 5A is an enlarged detailed view of the circular section shown by the dashed line at the bottom of FIG. 5;

FIG. 5B is an enlarged detail view of the circular section shown by the dashed line at the top of FIG. 5;

BEST MODE FOR CARRYING OUT THE PREFERRED EMBODIMENT

Figure 1:
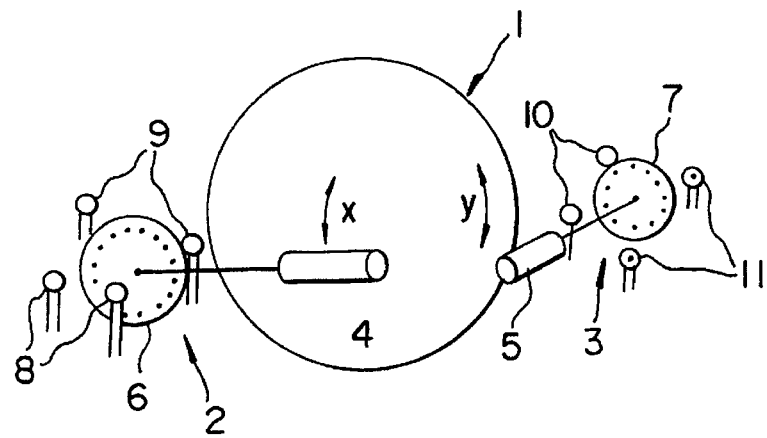
FIG. 1 is a schematically exploded perspective view illustrating the configuration of a ball mouse according to the prior art.
Figure 2A:
FIG. 2 is a waveform illustrating the operation of the ball mouse according to the prior art.
Figure 2B:
Figure 2C:
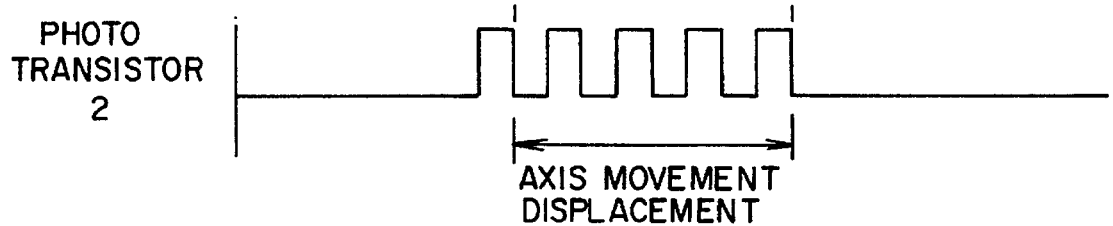
Figure 3:
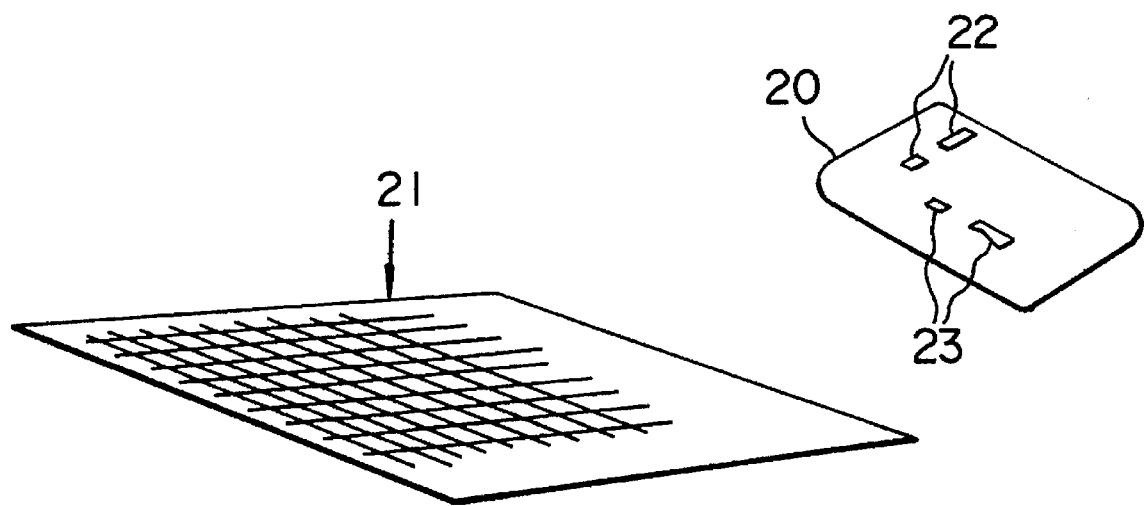
FIG. 3 is a schematically exploded perspective view illustrating the configuration of an optical pad detecting mouse according to the prior art.
Figure 4:
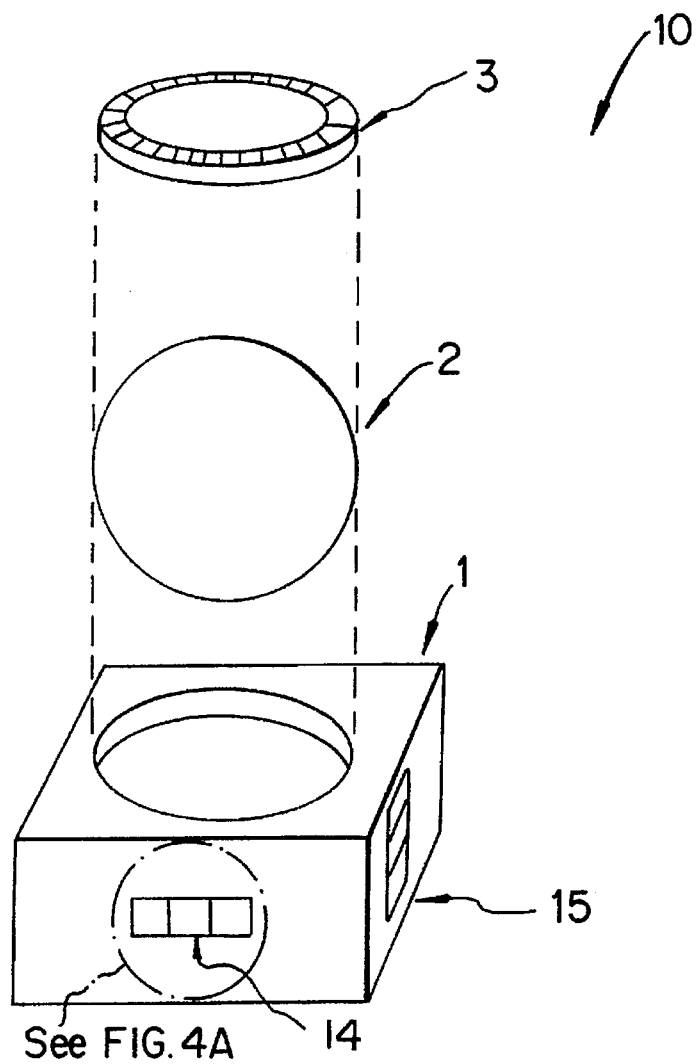
FIG. 4 is a perspective view illustrating a compact mouse structure according to the present invention.

FIG. 4 shows a compact mouse structure of a golf ball type. The compact mouse structure 10 comprises a housing 1 forming a cavity therein, an optical reflector 2 elastically supported to be rotated in the cavity; and a cover portion 3 preventing the separation of the optical reflector 2 from the housing 1 with the optical reflector 2 being elastically retained.

The housing 1 has a plurality of elastical supporting portions fixed on the corner or predetermined places around its lower periphery as shown in a crosssectional configuration in FIG. 5. That is, as shown in the enlarged view FIG. 5A of FIG. 5, a hole 5 is perforated by a predetermine depth into the thickness of the housing 1. An elastical spring 6 is inserted into the hole 5 to support a ball bearing 7. Thus, the elastical supporting portion 4 supports a ball of a golf ball type as described below.

The optical reflector 2 is received in the housing 1, and the cover portion 3 is covered on the upper thickness portion of the housing 1 to prevent the separation of the optical reflector 2 from the housing 1. The cover portion 3 includes a thread portion 11 around the periphery thereof to be threaded into the upper thickness portion of the housing 1. A pad liner ring 12 and a micro-ball bearing 13 is mounted at the corners around the periphery of the cover portion 3 to smoothly rotate the optical reflector 2 as shown in the enlarged view FIG. 5B of FIG. 5.

Figure 4A:
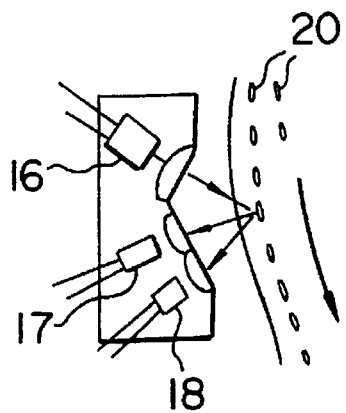
FIG. 4A is an enlarged detailed view of the circular section shown by the dashed line in FIG. 4.
Figure 4B:
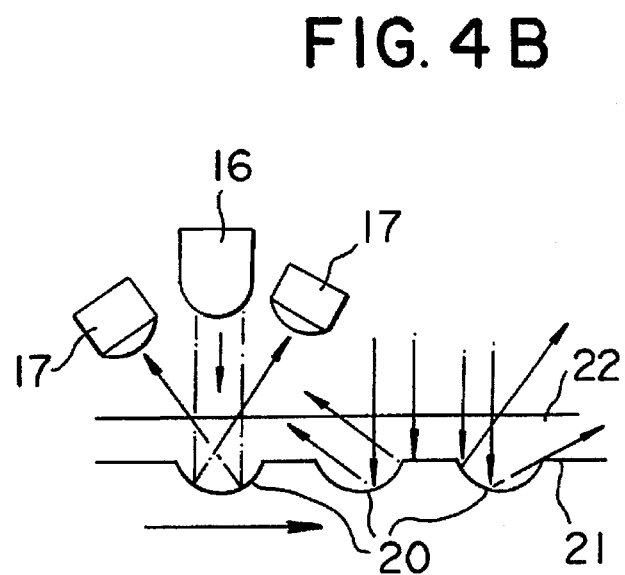
FIG. 4B is an enlarged detailed view of FIG. 4A showing the direction of light reflection of the grooves 20.

On the other hand, the housing 1 comprises position displacement sensing portions 14 and 15 for the X and Y axes mounted on the predetermined side surfaces thereof. As shown in the enlarged view FIG. 4A of FIG. 4, the position displacement sensing portions 14 and 15 comprises one infrared ray light emitting diode 16 and two photo-transistors 17 and 18, so that the photo-transistors 17 and 18 receive the light from the light emitting diode 16. Thus, the position displacement sensing portions 14 and 15 detect the phase displacement by sensing the movement speed of the optical reflector 2 by the reference of the time axes which the photo-transistors 17 and 18 receive the lights as shown in FIG. 4B. To it, the optical reflector 2 is configured so that a plurality of grooves 20 in the form of a crater are formed on the surface thereof. These grooves 20 are covered by a reflecting film 21 to reflect the lights from the light emitting diode 14, thereby enabling the grooves 20 to act as the light reflector. Also, a layer 22 made from transparent materials is coated by a predetermined thickness on the whole surface of the optical reflector 2 to enable the optical reflector 2 to smoothly rotate at its own position.

In particular, a click switch 19 is positioned at the center of the bottom surface of the optical reflector 2. The click switch 19 functions to detect the displacement of grooves 20 during the rotation of the optical reflector 2 as shown in FIG. 5. It can be operated on the plain surface in the case of a pen mouse described below.

Figure 6A:
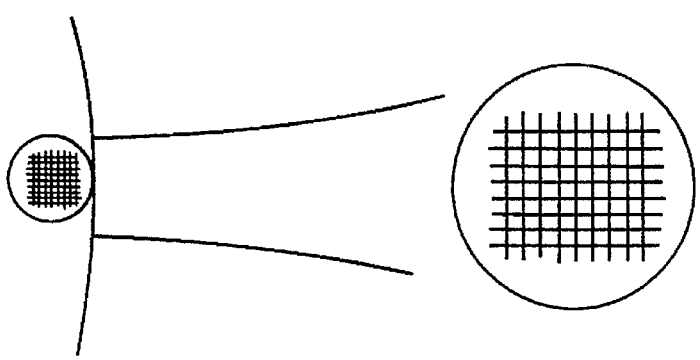
FIG. 6 is an enlarged view illustrating a ball configuration of another embodiment according to the invention.
Figure 6B:
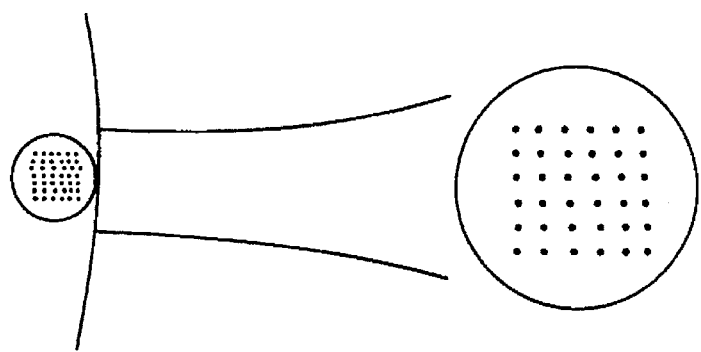

FIG. 6 shows other embodiment of a ball structure according to the invention. The embodiment is supposed to use an image information scanner instead of the position displacement sensing portions 14 and 15 for the X and Y axes in the previous embodiment. If the image information scanner is used, the matrix information A' the pointed information B or the bar code pattern not shown in the drawing are written on the surface of a ball. Therefore, this image information contains the position displacement information and the executive information to enable a computer to perform a predetermined function. Furthermore, it is adapted to an electronic appliance, a home appliance, etc. to control the operation thereof.

The matrix information A or pointed information B can be read by an existing image information scanner as a bar code scanner does, because the matrix information A and the pointed information B are constituted as patterns or symbols including white portions and black portions so as to be identified as predetermined control parameters by which infrared rays are reflected or non-reflected.

Figure 7:
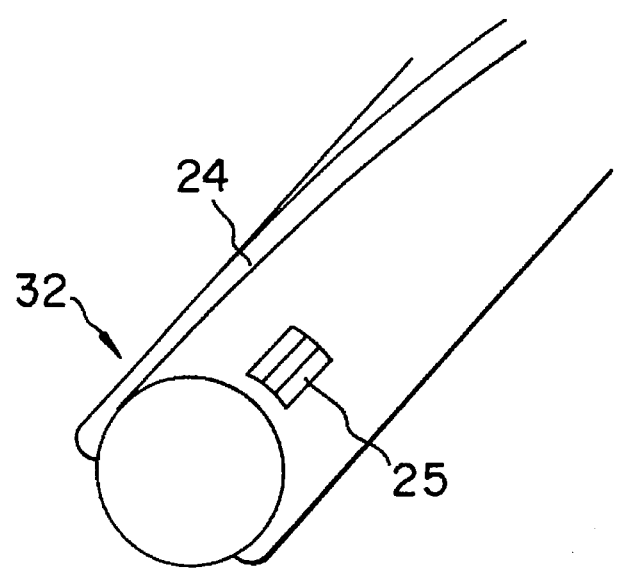
FIG. 7 is a view of another embodiment illustrating a pen mouse structure according to the invention.

FIG. 7 shows another embodiment of a mouse structure of a pen type. The pen mouse structure 32 can be realized by using the smallest golf ball. Also, the pen mouse structure 32 uses an optical fiber 24 in addition to the photo-coupler. Herein, it is noted that the optical fiber 24 is connected to a system terminal and a displacement sensing portion 25 for the X or Y axis including the photo-coupler in the same arrangement as that of the previous embodiment. The displacement sensing portion 25 is mounted on the predetermined position of the housing of the mouse structure 32.

INDUSTRIAL APPLICABILITY

The invention can miniaturize its structure by removing the necessity of an optical pad, etc. in a mechanism aspect. The invention has advantages that the information regarding the position displacement of a ball is accurately processed at the high speed and the control function regarding an electronic appliance is diversified.

I claim:

1. A compact mouse structure for detecting position displacement with a photo-coupler, said compact mouse structure comprising:

a housing;

a small optical reflecting means for reflecting light, said small optical reflecting means being a ball having a plurality of concaved reflectors with surfaces that are coated with a light reflecting material and a transparent material thereby being doubly coated to form a thickness; and a photo-coupler means mounted in said housing in a vertical and horizontal arrangement with respect to said concaved reflectors for emitting light and for receiving reflected light.

2. The compact mouse structure as claimed in claim 1, in which a plurality of image information patterns are formed on a surface of said ball and a scanner reads a pattern information to obtain said position displacement and a control parameter of an electronic appliance.

3. The compact mouse structure as claimed in claim 1, in which a pen type mouse structure is made by miniaturizing said optical reflecting means in maximum.

4. The compact mouse structure as claimed in claim 2, in which said image information patterns are formed by a matrix pattern and a bar code pattern.

* * * * *